United States Patent [19]

Morita et al.

[11] Patent Number: 4,948,847

[45] Date of Patent: Aug. 14, 1990

[54] PRODUCTION OF STYRENE RESINS BY CONTINUOUS BULK POLYMERIZATION

[75] Inventors: Tsuyoshi Morita; Kyotaro Shimazu, both of Chiba, Japan

[73] Assignee: Dainippon Ink and Chemicals, Inc., Tokyo, Japan

[21] Appl. No.: 242,164

[22] Filed: Sep. 9, 1988

[30] Foreign Application Priority Data

Sep. 11, 1987 [JP]  Japan .................................. 62-226522

[51] Int. Cl.$^5$ ........................... C08F 2/02; C08F 4/32
[52] U.S. Cl. ...................................... 526/64; 526/65; 526/67; 526/68; 526/88; 526/227; 526/228; 526/232; 526/232.3; 526/232.5; 526/346; 526/918
[58] Field of Search .................... 526/64, 88, 346, 65, 526/227, 228, 232, 232.3, 232.5, 67, 68

[56] References Cited

U.S. PATENT DOCUMENTS

| | | | |
|---|---|---|---|
| 4,209,599 | 6/1980 | Brady et al. ................. | 526/65 X |
| 4,376,847 | 3/1983 | Matsubara et al. ............ | 525/262 |

FOREIGN PATENT DOCUMENTS

| | | | |
|---|---|---|---|
| 0096201 | 12/1983 | European Pat. Off. ............ | 526/64 |
| 0173107 | 10/1983 | Japan ....................... | 526/65 |
| 2074591 | 11/1981 | United Kingdom ............... | 525/262 |

OTHER PUBLICATIONS

Abstract of Japanese Patent Publication No. 610/1972.
Abstract of Japanese Laid-Open Patent Publication No. 173107/1983.
Abstract of Japanese Laid-Open Patent Publication No. 1515/1984.
Polymer Processes, C. E. Schildknecht (ed.), Interscience, N.Y., 31 (1956).

Primary Examiner—Joseph L. Schofer
Assistant Examiner—F. M. Teskin
Attorney, Agent, or Firm—Sherman and Shalloway

[57] ABSTRACT

A process for producing a styrene resin by continuous bulk polymerization using a polymerization apparatus comprising a circulating line (I) for initial-stage polymerization including at least one tubular reactor having fixedly set therein a plurality of mixing elements having no moving parts and a main-polymerization line (II) following the circulating line (I) and including at least one tubular reactor having fixedly set therein a plurality of mixing elements having no moving parts; characterized in that while a polmerization solution containing a styrene monomer (A), an organic solvent (B) and an organic peroxide (C) whose half life reaches 10 hours at a temperature of 75° to 130° C. is polymerized in the initial stage while it is circulated through the circulating line (I), and at the same time, a minor part or a major part of the initial-stage polymerization solution is introduced continuously into the main-polymerization line (II) and polymerized.

10 Claims, 1 Drawing Sheet

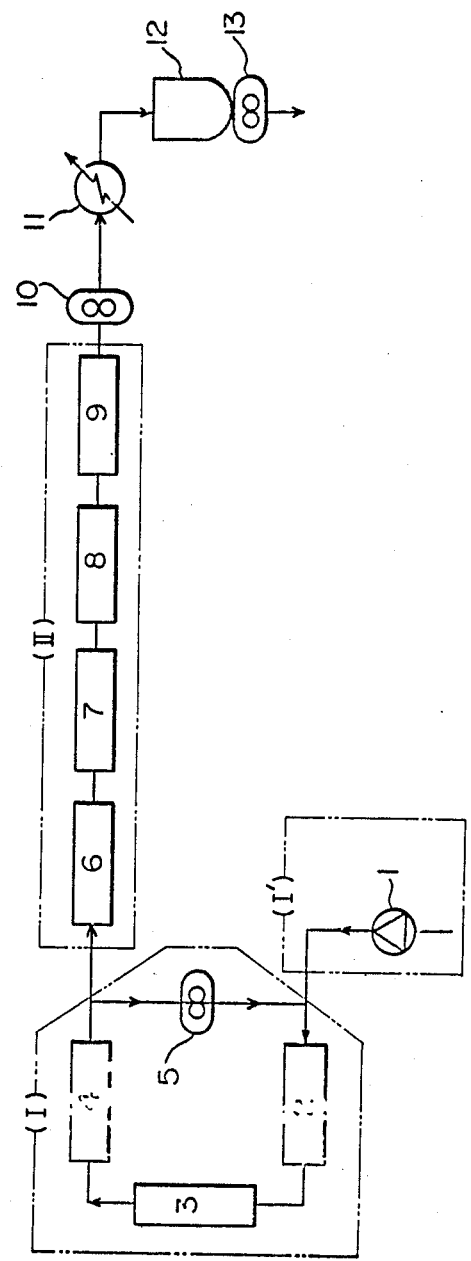

PRODUCTION OF STYRENE RESINS BY CONTINUOUS BULK POLYMERIZATION

BACKGROUND AND SUMMARY OF THE INVENTION

This invention relates to a process for continuous polymerization of a styrene monomer using a tubular reactor having fixedly set therein a plurality of mixing elements having no moving parts to produce a styrene resin having a high molecular weight and a narrow molecular weight distribution.

Industrial production of styrene resins has generally been carried out by a batchwise suspension polymerization method, and a continuous bulk polymerization method using a tower-type or tank-type reactor.

The batchwise suspension polymerization can give polystyrene having a weight average molecular weight (simply molecular weight hereinafter) of as high as 350,000 to 450,000, and its properties have been highly evaluated on the market. The advantage of this polymerization method is that since the monomer is polymerized while it is dispersed in water, the viscosity of the polymerization solution increases little as the polymerization proceeds. However, it involves a high cost because a large amount of a dispersing agent is used and the waste water should be treated. Moreover, the clarity of the polymer obtained is not so good. These problems are difficult to solve.

The continuous bulk polymerization method has excellent economy and productivity. However, it requires a large-sized plant, and in view of its process, there is a limit to mixing of a high-viscosity polymer solution at a stage where the polymerization has progressed, and to the removal of the heat of the reaction. It is extremely difficult to produce polystyrene having a molecular weight of more than 300,000 by this method. Approaches, from the standpoint of both the reaction apparatus and conditions, have previously been made to the solution of this problem in the continuous bulk polymerization. For example, there have been proposed a method in which the area of heat transmission is increased by using a draft tube in a multistage stirred tank type reactor provided with stirring vanes of a special structure (Japanese Patent Publication No. 610/1972) and a method in which 20 to 70% by weight of a styrene monomer is polymerized in the presence of a specific organic peroxide in a first stage reactor, and the polymerization is carried out at a higher temperature in a final reactor (Japanese Laid-Open Patent Publication No. 173107/1983).

However, in the multistage stirred tank-type reactor, the residence time of the polymer solution varies greatly, and a deadspace is liable to form. Thus, the reactor has a low volume efficiency, and the quality of the polymer tends to be degraded owing to the residence of the polymer. Furthermore in a commercial scale plant, the efficiency of mixing the highly viscous polymer solution of a high viscosity in a stage where the polymerization has proceeded to a great extent decreases, and the removal of the heat is difficult. Furthermore, because the polymer solution is of high viscosity, a great stirring power is required, and the energy cost becomes high. Accordingly, it is necessary to reduce the conversion in the final reactor or to add a solvent. Consequently, the molecular weight of the polymer is low, and the volume efficiency and productivity are reduced.

In an attempt to solve this problem, there has been proposed a method in which a tubular reactor having fixedly set therein a plurality of mixing elements having no moving parts is used in a later polymerization stage of a stirred tank-type reactor, and the polymerization is further carried out in it at an elevated temperature thereby to increase the conversion. However, since the reaction temperature is higher, the molecular weight distribution of the resulting polymer is broadened, and its mechanical properties are not satisfactory.

The present inventors noted, and studied, the use of tubular reactors, linked to each other, having fixedly set therein a plurality of mixing elements having no moving parts in which the polymer solution flows as a plug flow having little variation in residence time and can be mixed even when its viscosity is relatively high. A continuous bulk polymerization method for polystyrene using tubular reactors of this type connected to each other is shown, for example, in Japanese Laid-Open Patent Publication No. 1515/1984. According to this method, the problems of mixing and heat removal are solved by setting up a circulating line in the initial stage of the polymerization and circulating the polymerization solution through the line. Furthermore, this leads to a reduction in energy cost as compared with the case of using the multistage stirred tank-type reactor and also a reduction in the variations of the residence time of the polymer solution in the reactor.

Polystyrene obtained by this method, however, has a molecular weight of about 350,000 (determined on a sample taken at the exit of the reactor). If attempts are made to obtain polystyrene of a higher molecular weight, the rise of the viscosity of the polymer solution causes a large pressure drop in the tubular reactor. As a result, the energy cost rises and the plant cannot be operated stably. If the temperature in the latter half of the polymerization is sufficiently elevated in this method, the pressure drop in the tubular reactor can be reduced. But the molecular weight of the polymer decreases to, for example, about 250,000.

In this method, the latter half of the polymerization may be carried out in the presence of a peroxide, and this can increase the conversion, shorten the length of the polymerization line, and reduce the pressure drop. But the molecular weight of the polymer is decreased. In view of the foregoing background, the present inventors made extensive investigations on a process for producing high-molecular-weight styrene resins by continuous bulk polymerization using tubular reactor, linked to each other, having fixedly set therein a plurality of mixing elements having no moving parts. It has consequently been found that when a polymerization solution containing a monomer, an organic solvent and a specific organic peroxide is polymerized in the early stage while it is being circulated within a circulating line, and a minor part or a major part of the initial-stage polymerization solution is introduced into a polymerization line following the circulating line and polymerized, a styrene resin having a high molecular weight and a narrow molecular weight distribution is obtained, and the pressure drop in the polymerization line is greatly reduced, in spite of using the organic solvent and organic peroxide which are known to decrease molecular weight when used in a polymerization process involving the aforesaid multistage stirred tank-type reactor.

DETAILED DESCRIPTION OF THE INVENTION

Thus, according to this invention, there is provided a process for producing a styrene resin by continuous bulk polymerization using a polymerization apparatus comprising a circulating line (I) for initial-stage polymerization including at least one tubular reactor having fixedly set therein a plurality of mixing elements having no moving parts and a main-polymerization line (II) following the circulating line (I) and including at least one tubular reactor having fixedly set therein a plurality of mixing elements having no moving parts; characterized in that while a polymerization solution containing a styrene monomer (A), an organic solvent (B) and an organic peroxide (C) whose half life reaches 10 hours at a temperature of 75° to 130° C. is polymerized in the initial stage while it is circulated through the circulating line (I), and at the same time, a monor part of a major part of the initial-stage polymerization solution is introduced continuously into the main-polymerization line (II) and polymerized.

The tubular reactor used in this invention is a tubular reactor having fixedly set therein a plurality of mixing elements having no moving parts. The mixing elements may be those which perform mixing of the polymer solution by repeating division of the polymer solution flow coming into the tube, changing of the flowing direction and/or the dividing direction, and association of the divided flows. Examples of the tubular reactor include a Sulzer-type tubular mixer, a Kenix-type static mixer, and a Toray-type tubular mixer.

The total number of the tubular reactors used in this invention is not particularly limited, and in the case of a tubular reactor of the type exemplified above, differs depending upon the length of the tubular reactors, the number of mixing elements, etc. It is sufficient that at least one such tubular reactor is incorporated in each of the circulating line (I) and the main-polymerization line (II). For example, usually 4 to 15, preferably 6 to 10, tubular reactors usually having at least 5, preferably 10 to 40, mixing elements are used in combination. Among them, usually 1 to 10, preferably 2 to 6, tubular reactors are incorporated in the circulating line (I).

In the practice of the polymerization process of this invention, the polymerization solution to be fed to the circulating line (I) may, for example, comprise (A) a styrene monomer, (B) an organic solvent and (C) an organic peroxide whose half life reaches 10 hours at a temperature of 75° to 130° C. as essential components, and as required further contain known additives such as a plasticizer, an antioxidant and a chain transfer agent. The organic peroxide (C) need not always be fed together with the styrene monomer (A). It is possible to add the organic peroxide (C) diluted with the organic solvent (B) from another site of the circulating line (I) and circulate it through the circulating line (I).

The styrene monomer used in this invention generically denotes styrene, alpha-methylstyrene, and styrene derivatives resulting from substitution of a halogen atom or a $C_1$-$C_4$ alkyl group for a hydrogen atom on the benzene ring. Typical examples are styrene, o-chlorostyrene, p-chlorostyrene, p-methylstyrene, 2,4-dimethylstyrene and t-butylstyrene.

In the present invention, another monomer copolymerizable with the styrene monomer may be used in combination with the styrene monomer. Examples of the other monomer are acrylonitrile, acrylic acid, alkyl acrylates, methacrylic acid, alkyl methacrylates, maleic anhydride and various maleimides.

The organic solvent (B) used in this invention may be those which have a chain transfer constant of $0.1 \times 10^{-5}$ to $8 \times 10^{-5}$, and toluene, ethylbenzene and xylene are preferred. Ethylbenzene is especially preferred. These solvents may be used as a mixture.

Preferably, the weight ratio of the styrene monomer (A)/the organic solvent (B) is in the range of from 98/2 to 90/10 because this ratio permits efficient polymerization with a little rise in the viscosity of the polymer solution and a little decrease in reaction speed and molecular weight.

The organic peroxide (C) has a half life which reaches 10 hours at a temperature of 75° to 130° C., preferably 85° to 110° C. Specific examples of the organic peroxide (C) include peroxy ketals such as 1,1-di-t-butylperoxycyclohexane, 1,1-di-t-butylperoxy-3,3,5-trimethylcyclohexane, 2,2-di-t-butylperoxyoctane, n-butyl-4,4-di-t-butylperoxyvalerate and 2,2-di-t-butylperoxybutane; and peroxy esters such as t-butyl peroxyacetate, t-butyl peroxy-3,5,5-trimethylhexanoate, t-butyl peroxylaurate, t-butyl peroxybenzoate, di-t-butyl diperoxyisophthalate, 2,5-dimethyl-2,5-dibenzoylperoxyhexane, t-butylperoxymaleic acid and t-butyl peroxyisopropylcarbonate. They are used singly or in combination. Of these, 2,2-di-t-butylperoxybutane (whose half life reaches 10 hours at a tempeature of 104° C.), t-butyl peroxybenzoate (whose half life reaches 10 hours at 104° C.), and 1,1-di-t-butylperoxy-3,3,5-trimethylcyclohexane (whose half life reaches 10 hours at 90° C.) are preferred. The amount of the organic peroxide (C) is preferably such that its concentration is 50 to 400 ppm, particularly 100 to 250 ppm, based on the styrene monomer (A).

To obtain a high-molecular-weight styrene resin by the continuous bulk polymerization process of this invention, the polymerization solution is first fed continuously into the circulating line. It is also possible to set up a reactor in front of the inlet of the circulating line (I), start the polymerization of the polymerization solution while it is mixed in this reactor, and then feed it into the circulating line (I).

The polymerization solution fed into the circulating line (I) is continuously associated and mixed with the initial-stage polymerization solution circulated while being polymerized and mixed in the circulating line (I), and while circulating, polymerized and mixed in the tubular reactor at a reaction temperature of usually 110° to 140° C. while consuming the organic peroxide.

A minor part or a major part of the initial-stage polymerization solution circulating in the circulating line (I) is continuously fed into the main polymerization line (II) connected to the circulating line (I), and the remainder of the initial-stage polymerization solution circulates through the circulating line (I).

The recycle ratio (R) of the polymer solution is usually $R = F_1/F_2 = 1-15$, preferably 5–10 wherein $F_1$ *is the flow rate (liters/hr) of the remaining initial-stage polymer solution flowing in the circulating line (I), and $F_2$* is the flow rate (liters/hour) of the initial-stage polymer solution which is fed into the main-polymerization line (II).

In the initial-stage polymerization in the circulating line (I), the temperature $T_1$ (°C.) at which the half life of the organic peroxide (C) reaches hours, the reaction temperature $T_2$ (°C.) in the circulating line (I), and the average residence time t (hours) are usually properly selected within the range in which the following expression (1) is established. The polymerization is carried out under the selected reaction conditions until the polymerization conversion reaches 30 to 60% by weight.

$$\left(\frac{1}{2}\right)^{\frac{T_2-T_1}{10}} \leq \frac{t}{10} \quad (1)$$

wherein $T_1$ is 75° to 130° C., $T_2$ is 110° to 140° C., $(T_2-T_1)$ is 10° to 35° C., and t is 2 to 5 hours.

Preferably, the average residence time t is 3 to 5 hours, and the ratio of consumption of the organic peroxide in the initial-stage polymer solution flowing into the main-polymerization line (II) is at least 70% by weight, particularly at least 80% by weight.

The initial-stage polymer solution flowing into the main-polymerization line (II) is polymerized usually at 110° to 150° C.. while elevating the reaction temperature stepwise, until the conversion usually reaches 75 to 95% by weight, preferably 80 to 90% by weight. The polymerization mixture is then placed under reduced pressure in a devolatilization tank, for example, to remove the unreacted monomer and the solvent, and then the product is pelletized.

The continuous bulk polymerization process of this invention can efficiently and easily give a homopolymer of styrene having a weight average molecular weight (Mw) of 300,000 to 500,000, preferably 300,000 to 450,000 and a weight average molecular weight (Mw)/number average molecular weight (Mn), (Mw/Mn), of 2.0 to 3.0 or a styrene copolymer having a weight average molecular weight (Mw) of 200,000 to 350,000, preferably 200,000 to 300,000 and a weight average molecular weight (Mw)/number average molecular weight (Mn), (Mw/Mn), of 2.0 to 3.0.

The following Examples and Comparative Examples illustrate the present invention more specifically. All parts and percentages in these examples are by weight.

DESCRIPTION OF THE DRAWINGS

The attached drawing is a diagram showing the arrangement of the polymerization apparatus used in the following examples.

EXAMPLE 1

The polymerization apparatus shown in the accompanying drawing was used in this example.

A plunger pump (1) for feeding a polymerization solution is incorporated in a line (I') for material feeding. In the following circulating line (I) for initial-stage polymerization, three tubular reactors having an inside diameter of 2.5 inches and a length of 2 m (the static mixer of Gebüder Sulzer Aktiengesellschaft of Switzerland; including 30 mixing elements SMZ) (2), (3) and (4) and a gear pump (5) are connected in series in this order from the inlet of the circulating line (I). An exit following the main-polymerization line (II) is provided between the tubular reactor (4) and the gear pump (5). In the main-polymerization line (II) following the exit, tubular reactors (6), (7), (8; and (9) are connected in series in this order from the inlet of the main-polymerization line (II). To the reactor (9) are connected in series a gear pump (10), a preheater (11), a devolatilization chamber (12) and a gear pump (13).

A polymerization solution composed of 94 parts of styrene, 6 parts of toluene and 130 ppm (based on 94 parts of styrene) of 2,2-di-t-butylperoxybutane (whose half life reaches 10 hours at 104° C.) was prepared, and continuously polymerized in bulk under the conditions shown in Table 1. The polymerization mixture was heated to 230° C. in the preheater (11), and the volatile matter in it was removed in the devolatilization chamber (12) to give a styrene resin.

Samples were taken at the exit of the circulating line (I), the exit of the main-polymerization line (II) and the exit of the gear pump (13). The polymerization conversions of the samples were measured. The weight average molecular weights and the number average molecular weights of the samples were measured by a gel permeation chromatographic method, and the ratio (Mw/Mn) as a measure of molecular weight distribution was calculated. Furthermore, the pressures at the material feed section and the exit part of the main-polymerization line (II) were measured by a pressure gauge, and the pressure drop was calculated. Productivity was also calculated. The results are shown in Table 2.

EXAMPLE 2

A polymerization solution composed of 97 parts of styrene, 3 parts of toluene and 200 ppm (based on 97 parts of styrene) of 1,1-di-t-butylperoxy-3,3,5-trimethylcyclohexane (whose half life reaches 10 hours at 90° C.) was prepared, and polymerized continuously in bulk under the conditions shown in Table 1. The polymerization conversion, the weight average molecular weight, and the number average molecular weight of the polymer were measured, and the ratio of the weight average molecular weight to the number average molecular weight was calculated. The pressure drop and productivity were also determined. The results are shown in Table 2.

EXAMPLE 3

Bulk polymerization was carried out as in Example 2 except that ethylbenzene was used instead of 3 parts of toluene. As in Example 1, the polymerization conversion, the weight average molecular weight, and the number average molecular weight of the polymer were measured, and the ratio of the weight average molecular weight to the number average molecular weight was calculated. The pressure drop and productivity were also determined. The results are shown in Table 2.

COMPARATIVE EXAMPLE 1

Bulk polymerization was carried out as in Example 2 except that 1,1-di-t-butylperoxy-3,3,5-trimethylcyclohexane was not added. As in Example 1, the polymerization conversion, the weight average molecular weight, and the number average molecular weight of the polymer were measured, and the ratio of the weight average molecular weight to the number average molecular weight was calculated. The pressure drop and productivity were also determined. The results are shown in Table 2.

COMPARATIVE EXAMPLE 2

Bulk polymerization was started as in Comparative Example 1 except that the number of the tubular reactors in the main-polymerization line (II) was changed to 6. The pressure drop reached more than 50 kg/cm², and stable operation became impossible. Hence, the operation was stopped.

TABLE 1

| Polymerization Conditions | Example 1 | Example 2 | Example 3 | Comparative Example 1 |
|---|---|---|---|---|
| Flow rate $F_1$ (liter/hour) to the circulating line (I) | 63 | 49 | 49 | 49 |
| Flow rate $F_2$ (liter/hour) to the main-polymerizaiton line (II) | 7 | 7 | 7 | 7 |
| Reflux ratio (R = $F_1/F_2$) | 9 | 7 | 7 | 7 |
| Average residence time in the circulating line (hours) | 3 | 3 | 3 | 3 |
| Reaction temperature (°C.) Circulating line (I) | 120 | 120 | 120 | 120 |
| First half of the main-polymerization line (II) | 130 | 128 | 128 | 128 |
| Latter half of the main-polymerization line (II) | 136 | 137 | 137 | 137 |
| Ratio of consumption of the organic peroxide at the outlet of the circulating line (I) | 75 | >95 | >95 | — |

TABLE 2

| | Item | Example 1 | Example 2 | Example 3 | Comparative Example 1 |
|---|---|---|---|---|---|
| Polymerization conversion (%) | at the exit of the circulating line (I) | 35 | 40 | 39 | 31 |
| | at the exit of the main-polymerization line (II) | 81 | 85 | 84 | 73 |
| at the exit of the circulating line (I) | $\overline{M}w$ | 389,000 | 410,000 | 400,000 | 393,000 |
| | $\overline{M}n$ | 182,000 | 191,000 | 188,000 | 185,000 |
| | $\overline{M}w/\overline{M}n$ | 2.14 | 2.15 | 2.13 | 2.12 |
| at the exit of the main-polymerization line | $\overline{M}w$ | 376,000 | 400,000 | 391,000 | 357,000 |
| | $\overline{M}n$ | 164,000 | 181,000 | 175,000 | 155,000 |
| | $\overline{M}w/\overline{M}n$ | 2.29 | 2.21 | 2.23 | 2.30 |
| at the exit of the gear pump (13) | Pressure drop (kg/cm²) | 9 | 23 | 22 | 18 |
| | $\overline{M}w$ | 354,000 | 387,000 | 382,000 | 315,000 |
| | $\overline{M}n$ | 141,600 | 161,000 | 159,000 | 83,000 |
| | $\overline{M}w/\overline{M}n$ | 2.5 | 2.4 | 2.4 | 3.8 |
| | Productivity (kg/hr) | 5.0 | 5.4 | 5.4 | 4.6 |

We claim:

1. A continuous bulk polymerization process for producing a styrene resin homopolymer or copolymer which comprises
    introducing a polymerization reaction mixture comprising (A) a styrene monomer and optionally, at least one other monomer copolymerizable therewith, (B) at least one organic solvent having a chain transfer constant of $0.1 \times 10^{-5}$ to $8 \times 10^{-5}$ at a weight ratio of ((A)/(B) of from 98/2 to about 90/10, and (C) an organic peroxide having a half line of 10 hours at a temperature in the range of 75° to 130° C., into a circulating line (I) comprising at least one tubular reactor provided with a plurality of static mixing elements to form an initial stage polymerization solution,
    circulating said initial stage polymerization solution through said circulating line (I) to continuously associate and mix with said polymerization reaction mixture,
    withdrawing a portion of said initial stage polymerization solution of which at least 70% by weight of the organic peroxide (C) of the polymerization reaction mixture has been consumed from said circulating line (I) and continuously feeding said portion through a main-polymerization line (II) comprising a linear array of at least one tubular reactor provided with a plurality of static mixer elements and carrying out polymerization in said main-polymerization line.

2. The process of claim 1 wherein the polymerization reaction mixture in the circulating line (I) is polymerized until the polymerization conversion reaches from 30 to 60% by weight and the portion of the initial stage polymerization solution fed through the main-polymerization line (11) is polymerized until the polymer conversion reaches 75 to 95% by weight.

3. The process of claim 2 wherein the polymerization conversion in the circulating line (1) is from about 30 to 40% by weight and the polymerization conversion in the main-polymerization line (II) is from about 80 to 90% by weight.

4. The process of claim 1 wherein said organic solvent (C) is toluene, ethylbenzene or xylene.

5. The process of claim 1 wherein said organic solvent is ethylbenzene.

6. The process of claim 1 wherein the polymerization in the circulating line (I) is carried out at a temperature of from about 110° C. to 140° C. and the polymerization in the main polymerization line (II) is first carried out at a temperature in the range of from about 110° to 150° C. and then at a higher temperature in the range of from about 110° to 150° C.

7. The process of claim 1 in which the organic peroxide (C) has a half line which reaches 10 hours at a temperature of 85° to 110° C.

8. The process of claim 1 in which the organic peroxide (C) is at least one compound selected from the group consisting of 2,2,-di-t-butylperoxybutane, t-butylperoxybenzoate and 1,1-di-t-butylperoxy-3,3,5-trimethylcyclohexane.

9. The process of claim 1 in which the concentration of the organic peroxide (C) is 50 to 400 ppm based on the styrene monomer (A).

10. The process of claim 1 in which the styrene monomer is styrene, and the styrene resin has a weight average molecular weight (Mw) of 300,000 to 450,000 and the ratio of its weight average molecular weight (Mw) to number average (Mn) molecular weight, Mw/Mn, is 2.0 to 3.0.

* * * * *

UNITED STATES PATENT AND TRADEMARK OFFICE
CERTIFICATE OF CORRECTION

PATENT NO. : 4,948,847
DATED      : August 14, 1990
INVENTOR(S): MORITA, ET AL.

It is certified that error appears in the above-identified patent and that said Letters Patent is hereby corrected as shown below:

Claim 1, line 11, delete "line", insert --life--.

Claim 2, line 6, delete "(ll)", insert --(II)--.

Claim 3, line 2, delete "(l)", insert --(I)--.

Claim 7, line 2, delete "line", insert --life--.

Signed and Sealed this

Sixteenth Day of June, 1992

Attest:

DOUGLAS B. COMER

*Attesting Officer*           *Acting Commissioner of Patents and Trademarks*